United States Patent
Lundberg et al.

(10) Patent No.: US 11,785,342 B2
(45) Date of Patent: Oct. 10, 2023

(54) METHOD OF ACTIVATING AN OBJECT-SPECIFIC ACTION

(71) Applicant: Axis AB, Lund (SE)

(72) Inventors: Stefan Lundberg, Lund (SE); Jonas Hjelmström, Lund (SE)

(73) Assignee: AXIS AB, Lund (SE)

( * ) Notice: Subject to any disclaimer, the term of this patent is extended or adjusted under 35 U.S.C. 154(b) by 52 days.

(21) Appl. No.: 17/498,225

(22) Filed: Oct. 11, 2021

(65) Prior Publication Data

US 2022/0141388 A1    May 5, 2022

(30) Foreign Application Priority Data

Nov. 2, 2020  (EP) ................................ 20205217

(51) Int. Cl.
| | |
|---|---|
| *G06T 7/70* | (2017.01) |
| *H04N 23/695* | (2023.01) |
| *G06V 20/52* | (2022.01) |
| *H04N 23/63* | (2023.01) |
| *H04N 23/67* | (2023.01) |

(52) U.S. Cl.
CPC ............. *H04N 23/695* (2023.01); *G06T 7/70* (2017.01); *G06V 20/52* (2022.01); *H04N 23/633* (2023.01); *H04N 23/671* (2023.01)

(58) Field of Classification Search
CPC ......... H04N 5/23299; H04N 5/232121; H04N 5/232939; H04N 7/183; G06T 7/70; G06V 20/52; G06V 40/103; G06V 40/28; G06F 3/04842; G08B 13/19613; G08B 13/19689
See application file for complete search history.

(56) References Cited

U.S. PATENT DOCUMENTS

| | | | |
|---|---|---|---|
| 2002/0140814 A1 | 10/2002 | Cohen Solal et al. | |
| 2010/0013917 A1* | 1/2010 | Hanna .............. | G08B 13/19689 348/E13.001 |
| 2014/0362225 A1 | 12/2014 | Ramalingamoorthy et al. | |

(Continued)

FOREIGN PATENT DOCUMENTS

| | | |
|---|---|---|
| WO | 2007/104367 A1 | 9/2007 |
| WO | 2014/119991 A1 | 8/2014 |

OTHER PUBLICATIONS

Velloso, Eduardo, et al. "Motion correlation: Selecting objects by matching their movement." ACM Transactions on Computer-Human Interaction (TOCHI) 24.3 (2017): 1-35 (Year: 2017).*

(Continued)

*Primary Examiner* — Tat C Chio
(74) *Attorney, Agent, or Firm* — Volpe Koenig

(57) ABSTRACT

A method of activating an object-specific action comprises obtaining, based on image analysis of acquired images, a plurality of values of a movement characteristic, each value representing a moving object detected in the acquired images; receiving an input signal from a user input device, wherein the input signal represents a value of the movement characteristic for the user input device; comparing the value of the movement characteristic for the user input device with each value of the movement characteristics for the moving objects, and determining the moving object corresponding to the closest value of movement characteristic as a selected moving object; and activating the object-specific action for the selected moving object.

10 Claims, 2 Drawing Sheets

(56) References Cited

U.S. PATENT DOCUMENTS

| | | | |
|---|---|---|---|
| 2015/0249807 A1* | 9/2015 | Naylor | G08B 13/19682 |
| | | | 348/155 |
| 2016/0260300 A1* | 9/2016 | Wang | G08B 13/19645 |
| 2017/0023938 A1 | 1/2017 | Zang | |
| 2018/0139416 A1 | 5/2018 | Hirasawa et al. | |
| 2022/0084279 A1* | 3/2022 | Lindmeier | G06T 19/20 |

OTHER PUBLICATIONS

Extended European Search Report dated May 6, 2021 for European Patent Application No. 20205217.1.

Velloso et al, "Motion Correlation: Selecting Objects by Matching Their Movement," ACM Transactions on Computer-Human Interaction, vol. 24, Issue 3, Article No. 22, pp. 1-35 (Jul. 2017).

Vidal et al., "Pursuits: Spontaneous interaction with displays based on smooth pursuit eye movement and moving targets," UbiComp 2013—Proceedings of the 2013 ACM International Joint Conference on Pervasive and Ubiquitous Computing. 439-448 (2013).

Communication pursuant to Article 94(3) EPC dated Feb. 27, 2023 for European Patent Application No. 20205217.1.

* cited by examiner

METHOD OF ACTIVATING AN OBJECT-SPECIFIC ACTION

FIELD OF INVENTION

The present invention relates to the field of activating an object-specific action in a video displaying system. The activation includes selecting a moving object in a displayed video image.

TECHNICAL BACKGROUND

Digital video techniques are used for a variety of purposes, and surveillance is one of them. A common scenario relating to video surveillance is that an operator is viewing live-streamed or recorded video for the purpose of detecting moving objects that are interesting from a surveillance perspective. A video management system (VMS) is often used for displaying the video and providing video control or analytic functions.

When detecting an interesting moving object, further actions can be activated by the operator such as tracking of the moving object or zooming a camera view into the area of the moving object. There are several known ways of activating further actions and many of them are specific for the type of action. For object tracking, the operator may select the interesting moving object by clicking on it in the displayed video. For a pan, tilt, or zoom action, the operator may control a PTZ camera or a digital PTZ function by a joystick. Thus, depending on the action that is to be performed, different user input devices may need to be used. From a user perspective, it would be beneficial if the procedure of activating the further action can be performed in an easier and more intuitive manner and preferably without the need for additional equipment.

SUMMARY

Providing an improved way of activating different actions that are performed for a moving object would be beneficial. Such actions are referred to as object-specific actions within the context of this application. The description set forth hereinafter discloses a user-friendly and intuitive way of performing a selection of the moving object that the object-specific action is to be applied to. Once selected, the activation of the object-specific action may be done by a simple input maneuver or even be automatically activated by the selection.

According to a first aspect, a method includes selecting a moving object in a camera-monitored scene from a plurality of depicted moving objects by a movement of a user input device. The moving object that has a movement characteristic which is most similar to the corresponding movement characteristic of the user input device is selected as object for the object-specific action. This way of selecting the moving object is intuitive, or at least easy to learn, for a user since the selection is made by simply mimicking the movement, as viewed in the displayed video, of an interesting moving object with the user input device. When the moving object has been selected, the object-specific action may be activated by a simple input such as pressing a button. The object-specific action may even be automatically activated by the selection such that the object-specific action is performed upon determining the most similar moving object.

As used herein, the term "movement characteristic" means a type of property that the movement of a moving object can have. The movement characteristic may be a movement direction, i.e., a direction in which the moving object moves, or may be a movement speed, i.e., a speed in which the moving object moves. The movement characteristic is determined based on image analysis of video images taken by a camera viewing a scene. A value of a movement characteristic is therefore determined in a perspective of the camera. For example, a camera viewing a scene from above has a different perspective than a camera viewing a scene from the side. For a same movement of a moving object, video images from these cameras will likely result in different values of movement characteristic. However, since the selection is made by mimicking a movement as perceived by viewing the video, it does not matter which perspective the camera has.

The movement characteristic may be determined as part of an object detection. An object detection may include several determined parameters such as position, speed, and direction. An object detection may further include object meta data such as object class and object id. A movement characteristic value may thus be extracted from an object detection.

Examples of movement characteristics are movement direction and movement speed. As explained above, with movement direction is meant an object movement direction as seen in the perspective of the camera and thus as depicted in the video. In addition to being based on image analysis of acquired video images, the movement direction or movement speed may be determined based on measurement data from a ranging sensor. The ranging sensor may add information which can contribute to a more accurate determined movement direction. The ranging sensor is preferably located nearby or as an integrated part of the camera.

A value of a movement characteristic being object speed can be determined in a corresponding manner. Object speed in a sideways direction may be determined from image analysis of acquired images. Speed can be expressed relative an image coordinate system, for example as 10 pixels per frame or 300 pixels per second. In addition, a ranging sensor may be used for improving the determination of the object speed, also when there is a velocity component in a line of sight direction of the camera.

The method may be used with a variety of user input devices. Non-limiting examples include a joystick, a trackpad, a touch pad, a gesture control receiver, and a gaze control receiver. By gesture control receiver is meant a receiver of gesture input for the purpose of controlling or executing commands. The gesture control receiver may be adapted to identify and interpret gestures and translate them into commands. The gestures may for example be hand gestures. The gesture control receiver may comprise a camera. By gaze control receiver is meant a receiver of gaze input for the purpose of controlling or executing commands. The gaze control receiver may be adapted to identify gaze, i.e., the direction of an eye, to interpret gaze or gaze changes, and further to translate gaze or gaze changes into commands. The gaze control receiver may comprise a camera.

In one embodiment, the movement characteristic value for the user input device must be sufficiently similar to a movement characteristic value of a moving object in order to select the moving object. This embodiment removes illogical selections, for example where a moving object moving in a right direction is selected by a movement of the user input device to the left due to no identified left-moving objects. Such an illogical selection is likely due to an unintentional movement of the user input device and a user would probably be disturbed by it. By removing these selections, user-friendliness is improved. When the movement characteristic is object direction, the threshold may be configured such that one or more direction components of the movement characteristic values must be within a certain interval.

The method may be commenced with steps of acquiring images, detecting moving objects in the acquired images, and determining a value of the movement characteristic for each detected moving object. Thus, the plurality of values of movement characteristics is obtained. The images may be acquired by any suitable digital camera equipment. The images may be acquired in a separate image capturing device and transmitted to an image processing device for the steps of detecting moving objects and determining values of the movement characteristic. Further, the plurality of values of the movement characteristic may be transmitted to a further image processing device for comparing against the value of the movement characteristic of the user input device. Alternatively, one or more steps may be performed in a common device.

There is a wide range of object-specific actions that may be activated. Non-limiting examples include:
- configuration of a mechanical pan, tilt, and/or zoom movement for directing a PTZ camera towards the selected moving object;
- configuration of a digital pan, tilt, and/or zoom movement for directing a camera view towards the selected moving object;
- directing a light source towards the selected object;
- digital tracing of the selected moving object;
- tracking of the selected moving object;
- recording of image data representing the selected moving object;
- display of a bounding box surrounding the selected moving object;
- providing information about the selected moving object as an overlay in images of acquired images;
- providing information about other camera devices by which the selected object is detected;
- anonymizing an image area surrounding the selected moving object in acquired images;
- de-anonymizing an image area of the selected moving object in acquired images; and
- anonymizing an image area of the selected moving object in acquired images.

A common property for the object-specific actions is that their function is dependent on the selection of a moving object.

In one embodiment, the method comprises an additional re-selection process based on further movement of the user input device. In this embodiment, position data for the depicted moving objects are obtained again but in relation to the currently selected moving object instead of in relation to a global image coordinate system. Thus, the obtained position data indicates a position of each moving object in relation to a position of the selected moving object in the acquired images or, alternatively, in further, temporally succeeding, acquired images. Optionally, the obtaining of position data may be performed during a predetermined time period. If a further input signal is received from the user input device, and optionally on condition that it is received within the predetermined time period, a further value of the movement direction of the user input device is determined from the further input signal. Based on the obtained position data, a new selected moving object is determined as the moving object being positioned in a direction from the currently selected moving object that is closest to the further value of the movement direction. From the position data, a value of direction may be determined for each moving object, except for the currently selected one, in relation to the currently selected moving object. The values of direction may be compared with the further value of movement direction in order to determine the new selected moving object. Once selected, the same object-specific action is activated for the new selected object. Optionally, the object-specific action that was activated for the previously selected moving object is cancelled when the object-specific action is activated for the new selected object.

The possibility to re-select moving objects in the way that is described above may be allowed repeatedly such that the user may move around by use of the user input device. The additional re-selection process may be activated until no further user input has been received during a predetermined time period. Optionally, or additionally, the additional re-selection process may be activated until a specific user input, such as an input representing a press of an appointed button, is received. Another option is to enable the additional re-selection process until the user input device enters a standard starting position, for example the position of a joystick when its handle is relaxed.

As exemplified, the further user input may be received from the same user input device as the previously received user input. Alternatively, the further input signal may be received from a further user input device. For example, a first user input device may be received from a joystick which a second, further, user input device may be received from a keyboard.

According to a second aspect, the above discussed and other objects are achieved, in full or at least in part, by a non-transitory computer readable storage medium according to claim 12.

According to a third aspect, the above discussed and other objects are achieved, in full or at least in part, by a processing device according to claim 13. The processing device of the third aspect may generally be embodied in the same ways as the method of the first aspect with accompanying advantages.

In one embodiment, the obtaining function of the processing device comprises an acquiring function configured to acquire image. The obtaining function may acquire images by receiving them from an image sensor device. The obtaining function may further comprise a detecting function configured to detect moving objects in the acquired images. The detecting function may be provided by an object detector which provides object detections. The obtaining function may further comprise a determining function configured to determine a value of the movement characteristic for each detected moving object. The determining function may be a processing function configured to extract the values from object detections provided by an object detector of the detecting function.

According to a fourth aspect, the above discussed and other objects are achieved, in full or at least in part, by a video management system comprising the processing device according to the processing device of the fourth aspect.

A further scope of applicability of the present concepts will become apparent from the detailed description given below. However, it should be understood that the detailed description and specific examples, while indicating preferred embodiments, are given by way of illustration only, since various changes and modifications within the scope of the concepts will become apparent to those skilled in the art from this detailed description.

Hence, it is to be understood that is the concepts are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there may be one or more of the elements unless the context clearly dictates otherwise. Furthermore, the word "comprising" does not exclude other elements or steps.

BRIEF DESCRIPTION OF THE DRAWINGS

The embodiments will now be described in more detail by way of example and with reference to the accompanying schematic drawings, in which.

DETAILED DESCRIPTION

Figure 1:
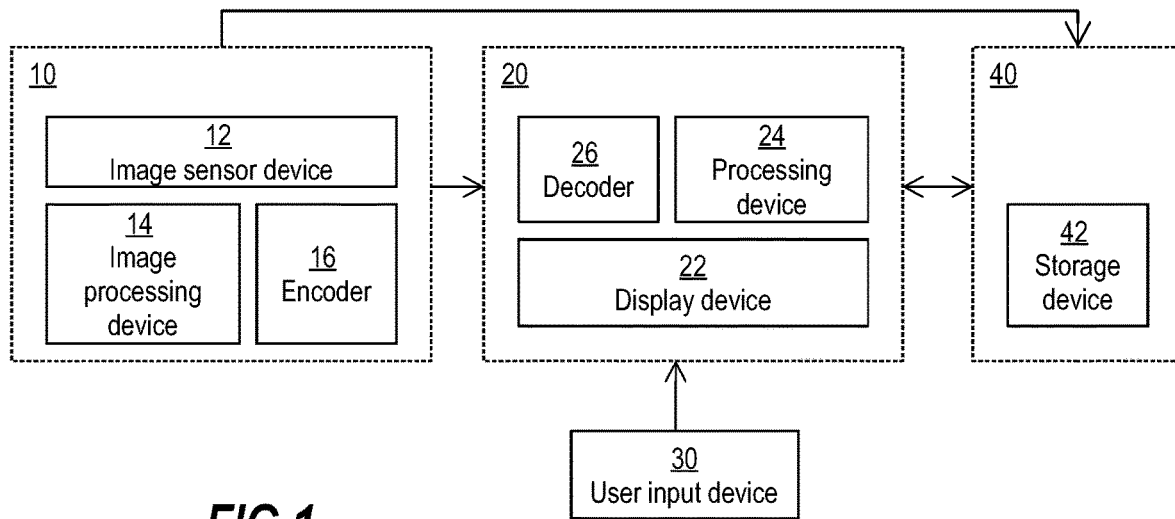
FIG. 1 illustrates a system which may be used for performing a method of activating an object-specific action.

A system for video surveillance by a user (also called operator) is illustrated in FIG. 1. The system includes well-known components being a monitoring camera 10, a VMS (video management system) 20, a user input device 30, and a storage device 40. The monitoring camera 10 comprises an image sensor device 12 for acquiring image frames, an image processing device 14 for processing the acquired image frames, and an encoder 16 for encoding the image frames into encoded video which is transmitted to the VMS 20. A purpose of the VMS 20 is to display acquired video for the user for the purpose of monitoring. The VMS 20 may be arranged to receive and display a live video stream from the camera 10 or display recorded video streams which may be retrieved from the storage device 40. It is noted that the VMS 20 is typically connected to more than one camera 10 and thus configured to receive, process, and display a plurality of video streams simultaneously. The VMS 20 comprises a decoder 26, a processing device 24, and a display device 22. The decoder 26 is configured to decode received the encoded video received from the camera 10. The processing device 24 is configured to perform processing necessary within the VMS 20. The display device 22 is configured to display the decoded video to the user on, e.g., a screen or monitor. The user input device 30 is connected to the VMS 20 to enable user control via the user input device 30. A typical user input device for a VMS is a joystick which may enable user control such as camera movement and zoom control.

By the system of well-known components illustrated in FIG. 1, a method of activating an object-specific action may be performed. The method will now be described with further reference to FIGS. 2 and 3.

Figure 2:
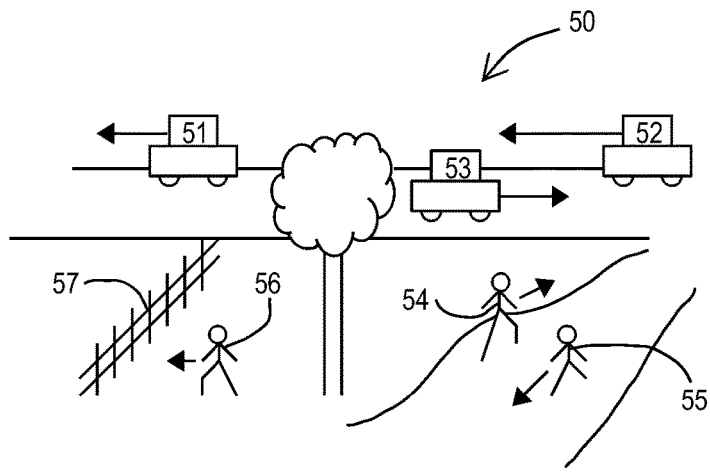
FIG. 2 illustrates a camera and a ranging sensor directed towards a scene.
Figure 2:
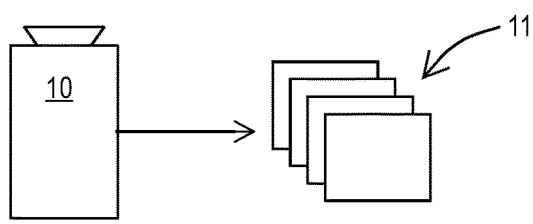
Figure 3:
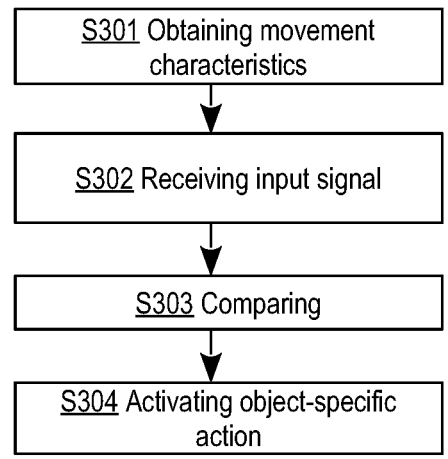
FIGS. 3 and 4 illustrate methods of activating an object-specific action according to different embodiments.

The camera 10 is in FIG. 2 arranged to monitor a scene 50. In other words, the camera 10 is directed towards the scene 50 and arranged to acquire images 11 depicting contents of the scene 50. In this example, the scene 50 includes a road on which vehicles 51, 52, 53 travel in different directions and with varying speed as indicated by arrows of different directions and lengths. A walkway is arranged next to the road. Two pedestrians 54, 56 are moving in opposite directions on the walkway. Further, a third pedestrian 56 is moving in an area by the side of the walkway and in a direction towards a fence 57. All movements of the vehicles and pedestrians are captured in the acquired images 11, forming an image sequence, which are displayed as a video to an operator. The operator is tasked with monitoring the scene 50 for detecting prohibited activities such as trespassing. If a suspected moving object is seen, the operator typically wants to inspect the situation further by, e.g., zooming in on the suspected moving object, activating an object tracker for the suspected moving object, or activating video recording of the whole video or parts thereof. Several different activities may be activated at the same time.

The process of selecting the suspected moving object in the VMS 20 comprises a step S301 of obtaining movement characteristics by image analysis of the acquired images 11. Moving objects of the scene 50 are detected by comparing image data between sequential images of the acquired images 11. Values of one or more movement characteristics, such as movement speed and movement direction, are also determined for the detected moving objects. An object detection algorithm may be utilized for performing object detection wherein values of movement speed and movement direction are typically also determined. From the object detections, the movement characteristic value, or values, for each moving object of the scene 50 may be extracted. Thus, for each moving object in the scene 50, i.e., the vehicles 51-53 and the pedestrians 54-56, values of one or more movement characteristics are now known from image analysis of the acquired images 11. In this example, values of both movement characteristics movement speed and movement direction are determined. However, the method may include obtaining values of only one type of movement characteristic.

In one embodiment, there is provided a ranging sensor device (not illustrated) in addition to the camera 10 or as an integrated part of the camera 10. The ranging sensor device may comprise a radar sensor or a LIDAR sensor to provide information of how deep into the scene 50 different objects are located. The ranging sensor may be used for adding information to the determination of movement characteristics, in particular with respect to movement direction and movement speed. Hence, the determining of movement characteristic may be performed by image analysis with further help from data acquired by the ranging sensor. In the following disclosure, however, the method will be discussed without using ranging sensor data.

The step S301 of obtaining movement characteristic values for the moving objects of the scene 50 is a continuous process that is performed during image acquisition. The values of the one or more movement characteristics for moving object currently appearing in the scene 50 may be stored in a list and updated regularly.

The operator monitoring the scene 50 reacts to the suspicious behaviour of the third pedestrian 56 who is moving towards the fence 57 and may be in the process of trespassing. The operator wants to inspect the image area of the third pedestrian 56 in more detail by zooming into that image area. The operator moves the user input device 30, in this example a joystick, slightly to the left, optionally with an additional input, such as a keyboard input, for indicating that an object is to be selected for an object-specific action. The movement of the user input device 30 is represented by an input signal that is received in step S302. The input signal may be received and processed by the processing device 24 of the VMS 20.

In general, input signals of user input devices represent user input device movement. There exist various known formats for the representation. An example is that the input signal comprises x and y values that represents the movement of the user input device in a 2D x-y coordinate plane performed by the user input device since a preceding input signal. The user input device may in that case send out vector values representing its latest movement with a certain frequency. By knowing the frequency, the movement speed may also be determined from the vector. The vector values of the user input signal may be mapped against a coordinate system of the video images in the same way that movement of a computer mouse is mapped against a display cursor. The format of the input signal and the mapping against a video image coordinate system follows conventional techniques and is not particularly configured or adjusted for the purposes of the disclosed method.

From the input signal of the user input device 30, one or more values of the movement characteristics is determined. For the illustrated embodiment, the movement characteristics of movement direction and movement speed are both used. Thus, from the received input signal, a value of movement direction and movement speed of the joystick movement "slightly to the left" is determined. This value could be represented by a vector in a format of [x, y, s], where x and y represented movement direction and s represents movement speed. The exemplified joystick movement may have the value of [−1, 0, 5]. The components −1 and 0 can be seen as a vector pointing in a "full left" direction and the component 5 may be seen as the amplitude of the vector which indicates the movement speed. The range of the direction components can be set within any suitable interval, in this case −1 to +1.

As exemplified, the input signal may provide a direct representation and/or an indirect representation of one or more values of the movement characteristics. In the above example, the value components of the movement direction are directly represented by the input signal indicating movement of the user input device. Further, the value component of the movement speed is indirectly represented by the input signal by combining the movement of the user input device with a known frequency of the input signal transmission.

A next step of the method is to compare S303 the determined value of the movement characteristics, obtained from the input signal, with each value of the movement characteristics for the moving objects to find the closest one. In this example, the values of movement direction and movement speed, in the same format (x, y, s) as the determined value of the movement characteristics for the user input device, for the moving objects are according to the following list (which may be stored and updated in a memory of the VMS 20):

| Moving object | Value (x, y, s) |
|---|---|
| Vehicle 51 | −1, 0, 12 |
| Vehicle 52 | −1, 0, 25 |
| Vehicle 53 | +1, 0, 12 |
| Pedestrian 54 | +0.6, +0.4, 5 |
| Pedestrian 55 | −0.5, −0.5, 8 |
| Pedestrian 56 | −1, 0, 3 |

The value of the movement characteristics in the list that is closest to the value of the movement directions for the user input device 30 is (−1, 0, 3) which represents the pedestrian 56. The closest value may be found by determining the vector in the list with the lowest sum of elementwise difference relative the vector of value of the movement characteristics for the user input device. The comparison may include a weighting mechanism which puts higher importance on a small difference between the value components of the movement direction compared to the movement speed. In other words, a low similarity in movement speed may be compensated by a high similarity in movement direction and thus it becomes more important in which direction that the user input device is moved compared to how much it is moved.

In a variant of the embodiment, the method may comprise a further step of determining if a difference between the value of the movement characteristics of the user input device and the closest value of the movement characteristics is below a threshold. Thus, the movement of the user input device must be sufficiently similar to the closest movement for a moving object for a selection to be made. In case the threshold exceeded, no selection of moving object is made. The method may begin again at step S302 upon receiving another input signal from the user input device 30.

Going back to the main version of the embodiment, the pedestrian 56, being the moving object corresponding to the closest value of the movement characteristics, is selected. In a next step S304, an object-specific action is activated for the selected object, i.e., the pedestrian 56 in this case. The object-specific action is in this example predetermined to be a zoom action which performs a digital zoom within the view that is displayed to the operator. The zoom action enlarges an image area that is given as input to the action and displays it on the display for the operator to view. In this example, an image area covering the pedestrian 56 and some surrounding area is given as input to the zoom action. The zoom action may be combined with a tracking action which tracks the selected moving object, in this case the pedestrian 56, and feeds the zoom action with updated image areas representing a current position of the selected moving object such that the zoom action can adapt to movements of the moving object. Which object-specific action that is activated may be changed by a user input or other control.

The object-specific action may be triggered automatically by the selection of the moving object, or may require a further user input. The further user input may be in the form of a key press (on the current or other user input device). The further user input may be received as a part of a further input signal from the user input device or other user input device.

In one embodiment, there may be multiple object-specific actions available to activate, wherein the activation is performed by further user input specific for the desired object-specific action. The further user input may be in the form of a voice command provided by the operator and received and interpreted by the VMS 20. Accordingly, the operator may use a joystick as user input device 30 to select the pedestrian 56, followed by providing a voice command "zoom" which is received by a microphone of the VMS 20 and interpreted to activate the zoom action for the pedestrian 56.

Depending on the choice of movement characteristic, the selection may be implemented differently in different embodiments, however the overall method of selecting the moving object having most similar movement characteristic to movement of the user input device 30 is the same.

In one embodiment, the movement characteristic is only movement speed instead of both movement speed and movement direction as in the embodiment disclosed above. In this embodiment, values of the movement speed for the moving objects of the scene 50 are determined and may be kept in a list. The speed values may preferably indicate some kind of movement direction. For example, a negative speed represents movement in a left direction of the scene 50 and a positive speed represents movement in a right direction of the scene 50. The list for the moving objects of the scene 50 may look like this:

| Moving object | Value of speed |
|---|---|
| Vehicle 51 | −30 |
| Vehicle 52 | −60 |
| Vehicle 53 | +30 |
| Pedestrian 54 | +5 |
| Pedestrian 55 | −8 |
| Pedestrian 56 | −5 |

When receiving S302 input signal from the user input device 30, which in this embodiment may still be a joystick, a value of movement speed for the user input device 30 is determined based on the received input signal. A very quick movement of the joystick handle the right would result in a selection of the vehicle 53 having a high speed to the left. A medium quick movement of the joystick handle to the left may result in a selection of vehicle 51 or pedestrian 55. Which type of implementation, specifically which movement characteristics that the selection is based on, is selected depending on the type of application.

Figure 4:
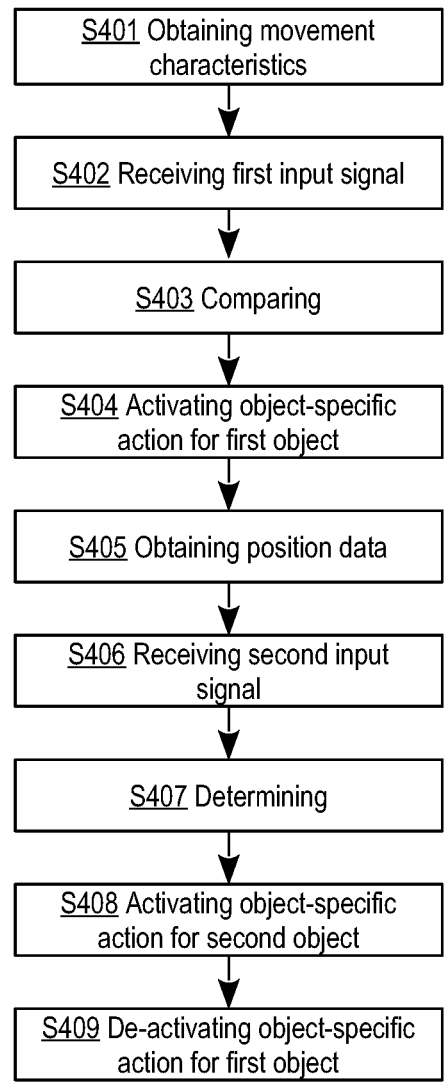

A selection mechanism according to one embodiment is illustrated in FIG. 4. The first steps of obtaining S401 movement characteristics, receiving S402 first input signal (from the user input device), comparing S403 values of the one or more movement characteristics of the moving objects and the user input device, and activating S404 an object-specific action of the first object corresponds to the steps S301-S304 disclosed above. The steps S401-S404 may be implemented and varied in the same manner as already discussed. Once the user-specific action has been activated S404 for the first object, the selection mechanism is however still active in this embodiment. The selection mechanism enables a re-selection of the selected moving object by a further movement or input of the user input device or of another user input device. For this purpose, the method further comprises an obtaining S405 position data for the moving objects which may be done using conventional image analysis technique. The position data indicate a position of each moving object in relation to a position of the already selected moving object. The position data may be obtained from the same acquired image as the values of movement characteristic were obtained from, or from further acquired images if such are available. The step of obtaining S405 position data may be performed repeatedly based on newly acquired images while waiting for the next step of receiving S406 a second input signal from the same or another user input device. The second, further, input signal represents a value of a further user input device movement direction. For example, when using a joystick as user input device, the second input signal may represent a movement of the handle in a certain direction. Thus, a further value of the movement direction is determined from the second user input signal. The user input device movement may be made in addition to a handle movement performed in step S402, however with a movement stop therebetween. Alternatively, the second input signal may be received from another user input device, such as another joystick or from an arrow button of a keyboard.

Based on the position data, a new selected moving object is determined S407 as the moving object being positioned in a direction from the selected moving object that is closest to the further value of the movement direction for the user input device. An example with reference to FIG. 2 will now be disclosed. In a first round of object selection, the pedestrian 55 has been selected. The selection may be indicated in the displayed video as an overlayed bounding box of the pedestrian 55. Thus, the user can easily follow which object in the scene 50 that is currently selected. If the user wants to instead select the pedestrian 54, she can make a re-selection by indicating a movement direction toward the pedestrian 54. The movement direction may be indicated by an additional movement of a joystick slightly to the left and/or upwards. From an input signal of the joystick movement, a value of movement direction is determined and compared with position data determined from image analysis of acquired images. The pedestrian 54 will be determined as the new selected moving object, and may be provided with a surrounding bounding box.

Returning to FIG. 4, the method comprises activating S408 the object-specific action for the second moving object, that is new selected moving object. For example, if a zoom action is activated for the pedestrian 55 and the pedestrian 54 is determined as the new selected moving object, the zoom action is activated for the pedestrian 54. For the original/former selected moving object, the object-specific action may be de-activated S409. In some embodiments, it may be desirable to activate the object-specific action for the new selected moving object in addition to the object-specific action being activated for the first selected moving object, i.e., the object-specific action is not de-activated for the first selected moving object. For example, if the object-specific action is to initiate storing of image data corresponding to an image area covering the selected moving object, it may be desirable to continue the storing of image data of the first selected moving object and, in addition, activate storing of image data corresponding to an image area of the second moving object.

Returning to FIG. 2, another embodiment of the method of activating an object-specific action will now be discussed. In this embodiment, the movement characteristic is movement direction. Thus, when a user wants to select a moving object of interest of the scene 50, she will move a user input device in a direction corresponding to the movement direction of that moving object. For the scene 50 where some of the moving objects are moving in approximately the same direction, there may be more than one moving object that fulfils the condition of having the most similar value of movement direction as the value of movement direction of the user input device. For example, both vehicles 51, 52, and the pedestrian 56 are moving in a straight left direction. The method may comprise a further selection criterium in case several moving objects have the most similar value of movement direction, or if several moving objects have a value of movement direction that sufficiently similar, i.e., the difference between the value of movement direction for the moving object and for the user input device has a different not exceeding a certain threshold.

As a further selection criterium, the moving object having the lowest speed may be selected. The selection may be performed by determining values of movement speed for the vehicles 51, 52, and the pedestrian 56. The selection criterium may of course be varied. For example, the moving object having the highest speed may be selected.

The further selection criterium may be correspondingly applied to an embodiment where several moving objects have the most similar value of another movement characteristics, for example value of movement speed. In that case, further movement characteristics may be taken into account. For example, values of movement direction may be determined for the moving objects having the most similar values of movement speed. Further, a value of movement direction may be determined from the already received input signal of the user input device. By comparing the values, the most similar value of movement direction may be determined, and the corresponding moving object is selected. Thus, the comparison of values of different movement characteristics may be performed in a step-wise manner wherein a subset of moving objects is selected by a comparison of a first movement characteristic and the selected moving object is determined from the subset of moving objects based on a comparison of a second movement characteristic.

The disclosed embodiments implementing a further selection criterium may be combined with the embodiment illustrated in FIG. 4. The steps S401-S404 may be performed as disclosed with a further selection criterium implemented where the first moving object is selected from a subset of moving objects. Thereafter, the step of obtaining S405 position data may be performed for the subset of moving objects, thus not for all moving objects in the scene 50. Thereby, the user will be able to make further selections within the subset of moving objects that are most similar to the initial movement of the user input signal, as received in step S402. Going back to FIG. 2, the user may for example be able to re-select the moving object within a subset of the pedestrian 56 and the vehicles 51,52 after an initial selection of one of these moving objects based on a movement direction. An advantage of this embodiment is that the user is allowed to make a rough selection of first moving object to indicate approximately which direction the moving object of interest is, and then make re-selection within the subset of moving objects similar to the initial movement thus disregarding the moving objects that are not similar to the initial movement.

Returning to FIG. 1, the implementation of different components configured to perform the method steps as described is not limited to any particular hardware or software configuration. The processing device 24 may comprise circuitry that is configured to execute an obtaining function, a receiving function, a comparing function, and an activating function. The obtaining function may further comprise an acquiring function, a detecting function, and a determining function.

In a hardware implementation, the circuitry of the processing device 24 may be dedicated and specifically designed to provide its functionality. The circuitry may be in the form of one or more integrated circuits, such as one or more application specific integrated circuits or one or more field-programmable gate arrays.

In a software implementation, the circuitry of the processing device 24 may instead be in the form of a processor, such as a microprocessor, which in association with computer code instructions stored on a (non-transitory) computer-readable medium, such as a non-volatile memory, causes the processing device 24 to carry out its functions.

Examples of non-volatile memory include read-only memory, flash memory, ferroelectric RAM, magnetic computer storage devices, optical discs, and the like. In a software case, the functions executed by the circuitry of the processing device 24 may thus each correspond to a portion of computer code instructions stored on the computer-readable medium, that, when executed by the processor, causes processing device 24 to carry out the functionality of the component.

It is to be understood that it is also possible to have a combination of a hardware and a software implementation, meaning that the some of the functions are implemented in hardware and others in software.

The invention claimed is:

1. A method of selecting a moving object in a live video stream and activating an object-specific action in a video displaying system, the method comprising:
   acquiring images of a live video stream by a pan/tilt/zoom (PTZ) camera arranged to be controlled by a joystick for pan, tilt or zoom action,
   obtaining, based on image analysis of the acquired images, a plurality of values of a movement characteristic of a plurality of moving objects, each value of the movement characteristic representing a moving object detected in the acquired images,
   receiving an input signal from the joy stick, wherein the input signal represents a value of the movement characteristic of the joystick,
   selecting the moving object that has a movement characteristic which is most similar to the corresponding movement characteristic of the joystick by
   comparing the value of the movement characteristic of the joystick with the value of the movement characteristics of each one of the moving objects, and determining the moving object having a value of movement characteristic closest to the value of movement characteristic of the joystick as a selected moving object, and
   activating an object-specific action for the selected moving object;
   obtaining position data for the moving objects, including the selected moving object, wherein the position data indicate a position of each moving object in relation to a position of the selected moving object in the acquired images or in further acquired images,
   receiving a further input signal, wherein the further input signal represents a value of a further user input device movement direction,
   based on the position data, determine a new selected moving object as the moving object being positioned in a direction from the selected moving object that is closest to the value of the further user input device movement direction, and
   activating the object-specific action for the new selected moving object.

2. The method according to claim 1, wherein the movement characteristic is movement direction or movement speed.

3. The method according to claim 1, wherein the plurality of value of movement characteristics is obtained further based on temporally corresponding images of the moving objects acquired by a ranging sensor.

4. The method according to claim 1, further comprising:
   determining if a difference between the value of the movement characteristic of the joystick and the closest value of movement characteristic of the moving objects is below a threshold, and
   performing the act of determining the moving object corresponding to the closest value of movement characteristic as a selected moving object only if the difference is below the threshold.

5. The method according to claim 1, wherein the act of obtaining a plurality of values of a movement characteristic for moving objects comprises:
   detecting moving objects in the acquired images, and
   determining a value of the movement characteristic of each detected moving object.

6. The method according to claim 1, wherein the object-specific action comprises at least one of the following actions:
- configuration of a mechanical pan, tilt, and/or zoom movement for directing a PTZ camera towards the selected moving object;
- configuration of a digital pan, tilt, and/or zoom movement for directing a camera view towards the selected moving object;
- directing a light source towards the selected object;
- digital tracing of the selected moving object;
- tracking of the selected moving object;
- recording of image data representing the selected moving object;
- display of a bounding box surrounding the selected moving object;
- providing information about the selected moving object as an overlay in images of acquired images;
- providing information about other camera devices by which the selected object is detected;
- anonymizing an image area surrounding the selected moving object in acquired images;
- de-anonymizing an image area of the selected moving object in acquired images; and; anonymizing an image area of the selected moving object in acquired images.

7. The method according to claim 1 wherein the further input signal is received from the user input device.

8. The method according claim 1, wherein the further input signal is received from a further user input device.

9. The method according to claim 1, wherein the object-specific action for the selected moving object is cancelled.

10. A non-transitory computer readable storage medium having stored thereon instructions for implementing a method, when executed on a device having processing capabilities, comprising:
- acquiring images of a live video stream by a PTZ camera arranged to be controlled by a joystick for pan, tilt or zoom action,
- obtaining, based on image analysis of the acquired images, a plurality of values of a movement characteristic of a plurality of moving objects, each value of the movement characteristic representing a moving object detected in the acquired images,
- receiving an input signal from the joystick, wherein the input signal represents a value of the movement characteristic of the joystick,
- selecting the moving object that has a movement characteristic which is most similar to the corresponding movement characteristic of the joystick by comparing the value of the movement characteristic of the joystick with the value of the movement characteristics of each one of the moving objects, and determining the moving object having a value of movement characteristic closest to the value of movement characteristic of the joystick as a selected moving object,
- activating an object-specific action for the selected moving object;
- obtaining position data for the moving objects, including the selected moving object, wherein the position data indicate a position of each moving object in relation to a position of the selected moving object in the acquired images or in further acquired images,
- receiving a further input signal, wherein the further input signal represents a value of a further user input device movement direction,
- based on the position data, determine a new selected moving object as the moving object being positioned in a direction from the selected moving object that is closest to the value of the further user input device movement direction, and
- activating the object-specific action for the new selected moving object.

* * * * *